(12) United States Patent
Takahashi

(10) Patent No.: US 7,636,898 B2
(45) Date of Patent: Dec. 22, 2009

(54) FILE MANAGEMENT PROGRAM

(75) Inventor: Kimihide Takahashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 476 days.

(21) Appl. No.: 11/029,507

(22) Filed: Jan. 6, 2005

(65) Prior Publication Data

US 2005/0177796 A1 Aug. 11, 2005

(30) Foreign Application Priority Data

Jan. 8, 2004 (JP) ............................. 2004-002739

(51) Int. Cl.
*G06F 3/048* (2006.01)
(52) U.S. Cl. ................... 715/769; 715/808; 715/809; 715/770
(58) Field of Classification Search ............... 715/770, 715/769, 763–765, 748, 799, 808, 809, 858
See application file for complete search history.

(56) References Cited

U.S. PATENT DOCUMENTS

| | | | | |
|---|---|---|---|---|
| 5,668,966 A | * | 9/1997 | Ono et al. ................... | 715/853 |
| 5,745,718 A | * | 4/1998 | Cline et al. ................... | 715/777 |
| 5,832,470 A | * | 11/1998 | Morita et al. .................. | 707/1 |
| 5,933,599 A | * | 8/1999 | Nolan ........................ | 715/734 |
| 7,225,231 B2 | * | 5/2007 | Mendez et al. ............... | 709/206 |
| 2002/0051015 A1 | * | 5/2002 | Matoba ....................... | 345/764 |
| 2002/0057287 A1 | * | 5/2002 | Crow et al. .................. | 345/716 |
| 2003/0028553 A1 | * | 2/2003 | Kondo ......................... | 707/200 |
| 2003/0154190 A1 | * | 8/2003 | Misawa et al. ................. | 707/1 |
| 2003/0222915 A1 | * | 12/2003 | Marion et al. ............... | 345/769 |
| 2004/0193597 A1 | * | 9/2004 | Johnson ........................ | 707/6 |

FOREIGN PATENT DOCUMENTS

| | | |
|---|---|---|
| JP | 4-312140 A | 11/1992 |
| JP | 8-153121 A | 6/1996 |
| JP | 11-134233 A | 5/1999 |
| JP | 11-242669 A | 9/1999 |
| JP | 2002-055860 A | 2/2002 |
| JP | 2003-167770 A | 6/2003 |
| JP | 2003-178079 A | 6/2003 |
| JP | 2003-199028 A | 7/2003 |

* cited by examiner

*Primary Examiner*—Tadesse Hailu
(74) *Attorney, Agent, or Firm*—Birch, Stewart, Kolasch & Birch, LLP

(57) ABSTRACT

The computer readable medium has embodied thereon a file management program for processing by a computer, the file management program comprising: a first code segment for, when an icon of a first folder displayed on a display apparatus is dragged and dropped onto another icon of a second folder displayed on the display apparatus, creating a third folder at the same level as the second folder; and a second code segment for copying a file stored in the first folder and a file stored in the second folder into the third folder.

12 Claims, 13 Drawing Sheets

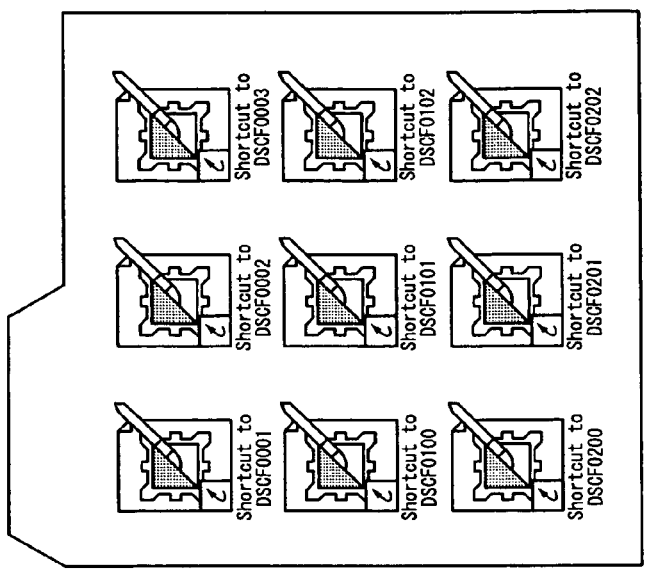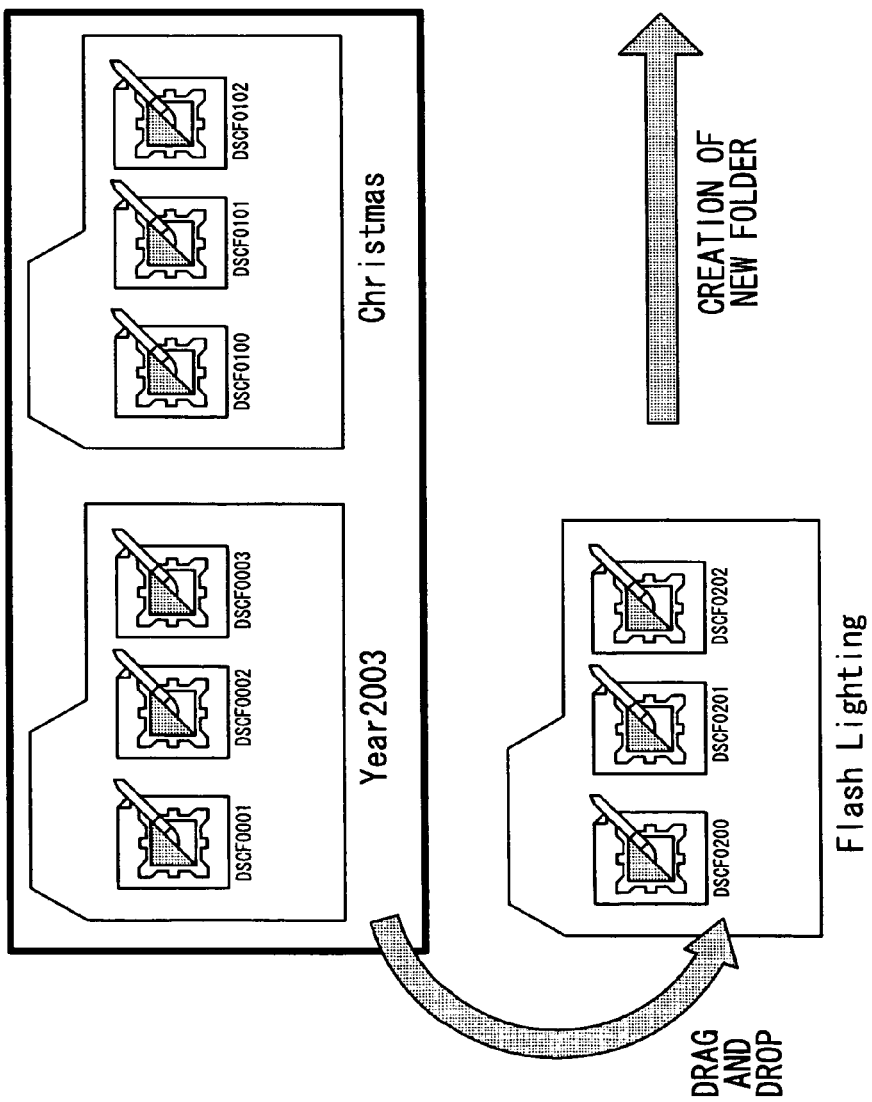
FIG.8

FILE MANAGEMENT PROGRAM

BACKGROUND OF THE INVENTION

1. Field of the Invention

The present invention relates to a file management program, and more particularly to a file management program which manages image files.

2. Description of the Related Art

In general, image data taken with a digital camera is incorporated into a personal computer and managed with the personal computer. However, a problem has existed in that the management of image data becomes more difficult as the amount thereof that is incorporated into the personal computer increases, and thus users are no longer able to readily find the image they wish to view.

To solve this problem, Japanese Patent Application Publication No. 2003-199028 discloses an electronic album device that, when managing image data, stores the image data after automatically classifying the data by predetermined categories (such as time stamp, date, image taking conditions, resolution, form, etc.) that are based on fundamental attributes of the image data. However, since the electronic album device merely classifies image data by categories such as time stamp, the problem arises that there may be little difference among images in the classification categories, or the images in the same classification may be irrelevant to each other. For example, the relation between classification by time and classification by date is that the classification by time subdivides the classification by date into smaller categories, constituting a drawback in that the classification becomes merely an inclusion relation of a set. Further, for classification by file volume or resolution, images taken at completely different dates or events are classified into the same category, constituting a drawback in that the relationship among images in the respective categories is reduced.

SUMMARY OF THE INVENTION

The present invention has been made in view of the foregoing circumstances, and it is an object of the invention to provide a file management program that enables simple file management.

In order to attain the aforementioned object, a first aspect of the present invention is directed to a computer readable medium having embodied thereon a file management program for processing by a computer, the file management program comprising: a first code segment for, when an icon of a first folder displayed on a display apparatus is dragged and dropped onto another icon of a second folder displayed on the display apparatus, creating a third folder at the same level as the second folder; and a second code segment for copying a file stored in the first folder and a file stored in the second folder into the third folder.

According to the present invention, when an icon of a folder displayed on a display apparatus is dragged and dropped onto an icon of another folder displayed thereon, a new folder is created at the same level as the latter folder. Then, files stored in the former folder and files stored in the latter folder are copied to the new folder.

In order to attain the aforementioned object, a second aspect of the present invention is directed to a computer readable medium having embodied thereon a file management program for processing by a computer, the file management program comprising: a first code segment for, when an icon of a first folder displayed on a display apparatus is dragged and dropped onto another icon of a second folder displayed on the display apparatus, creating a third folder at the same level as the second folder; and a second code segment for copying a shortcut file to a file stored in the first folder and a shortcut file to a file stored in the second folder into the third folder.

According to the present invention, when an icon of a folder displayed on a display apparatus is dragged and dropped onto an icon of another folder displayed thereon, a new folder is created at the same level as the latter folder. Then, shortcut files to files stored in the former folder and shortcut files to files stored in the latter folder are copied to the new folder.

In order to attain the aforementioned object, a third aspect of the present invention is directed to a computer readable medium having embodied thereon a file management program for processing by a computer, the file management program comprising: a first code segment for, when an icon of a first folder displayed on a display apparatus is dragged and dropped onto another icon of a second folder displayed on the display apparatus, creating a third folder at the same level as the second folder; and a second code segment for copying a file that is commonly stored in the first folder and the second folder into the third folder.

According to the present invention, when an icon of a folder displayed on a display apparatus is dragged and dropped onto an icon of another folder displayed thereon, a new folder is created at the same level as the latter folder. Then, files commonly stored in the former folder and in the latter folder are copied to the new folder.

In order to attain the aforementioned object, a fourth aspect of the present invention is directed to a computer readable medium having embodied thereon a file management program for processing by a computer, the file management program comprising: a first code segment for, when an icon of a first folder displayed on a display apparatus is dragged and dropped onto another icon of a second folder displayed on the display apparatus, creating a third folder at the same level as the second folder; and a second code segment for copying a shortcut file to a file that is commonly stored in the first folder and the second folder into the third folder.

According to the present invention, when an icon of a folder displayed on a display apparatus is dragged and dropped onto an icon of another folder displayed thereon, a new folder is created at the same level as the latter folder. Then, shortcut files to files commonly stored in the former folder and in the latter folder are copied to the new folder.

A fifth aspect of the present invention is directed to the medium of the second or fourth aspect, wherein the file management program further comprises a fourth code segment for, when the shortcut file is deleted, deleting the file that is linked to by the shortcut file.

According to the present invention, when shortcut files are deleted, files that are linked to the shortcut files are all deleted.

A sixth aspect of the present invention is directed to the medium of any of the first to the fifth aspects, wherein the file management program further comprises a third code segment for giving to the third folder a folder name made by combining a folder name of the first folder an a folder name of the second folder.

According to the present invention, a folder name in which the folder name of the former folder and the folder name of the latter folder are combined is allocated to the new folder. For example, if the folder name of the former is "A" and the folder name of the latter folder is "B", the folder name "BA" is allocated to the new folder.

The medium may be a propagated signal, and the propagated signal may be a carrier wave.

According to the present invention, files can be arranged to good efficiency to enable easy management of files.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein:

FIG. 8 is a conceptual diagram of file processing caused by dragging and dropping a folder;

DETAILED DESCRIPTION OF THE PREFERRED EMBODIMENTS

Hereunder, preferred embodiments for implementing the file management program of the present invention are described referring to the attached drawings.

Figure 1:
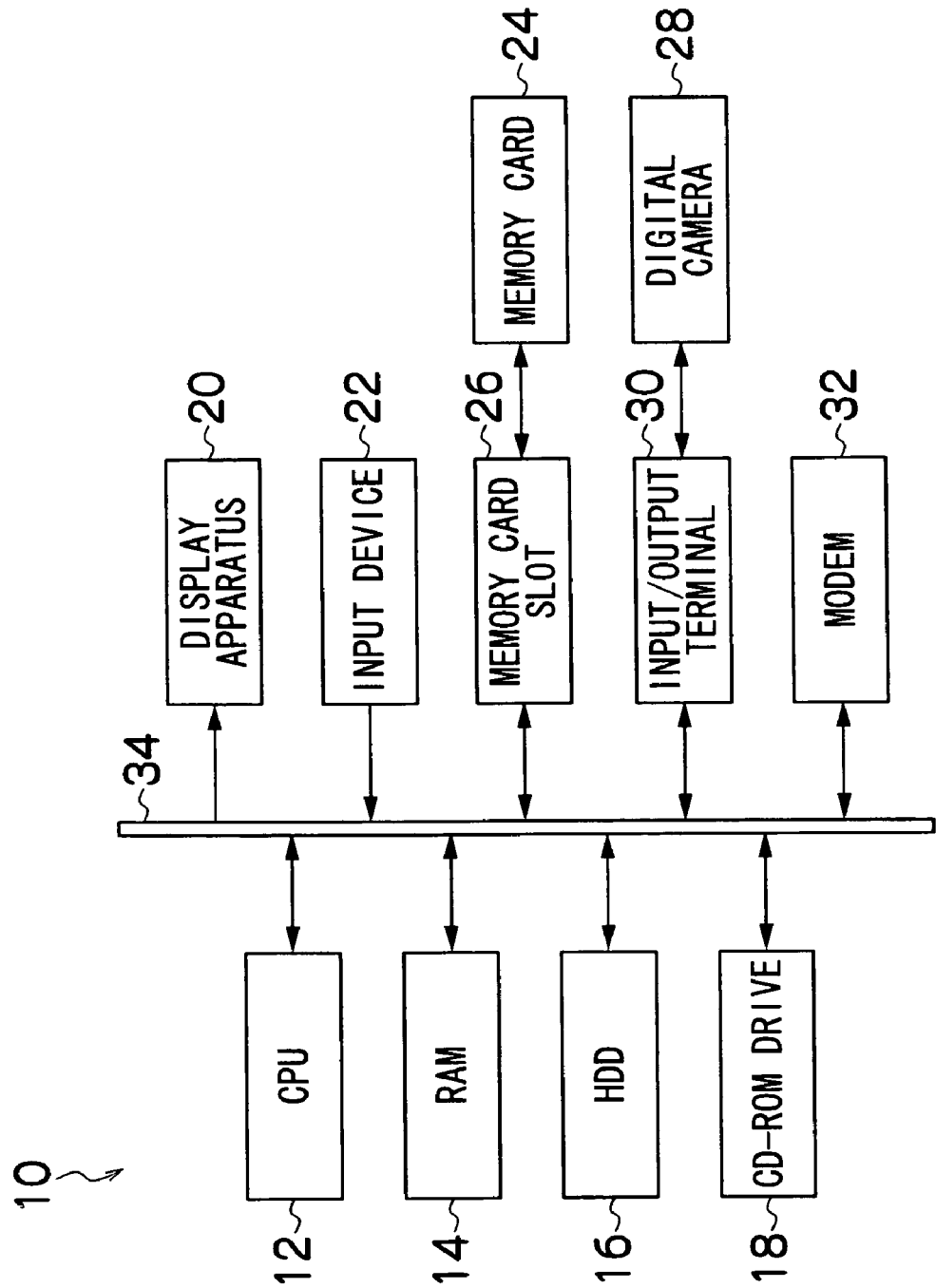
FIG. 1 is a block diagram showing an example of the hardware configuration of a personal computer.

FIG. 1 is a block diagram showing an example of the hardware configuration of a computer (personal computer) that implements the file management program according to an embodiment of the present invention.

A personal computer (PC) 10 is a commonly used type of computer, and comprises a central processing unit (CPU) 12 for executing an image classification program according to an embodiment of the present invention; a random access memory (RAM) 14 for temporarily storing results of operations in the CPU 12, image data and the like; a hard disk drive (HDD) 16 for storing an operating system (OS), the image classification program, various application programs, image files and the like; a CD-ROM drive 18 for reading data that is stored on a CD-ROM; a display apparatus 20 for displaying results of operations in the CPU 12, image data and the like; an input device 22 such as a keyboard and mouse for inputting commands and numerical values and the like; a memory card slot 26 for connecting a memory card 24 on which an image file is stored; an input/output terminal (for example, a USB terminal) 30 for connecting with a digital camera 28 or the like through a communication cable; and a modem 32 for communicating with a server through a network. These components are connected with each other by a bus 34.

The file management program according to the embodiment of the present invention is incorporated into an image viewing program (viewer) that views image files, and is provided as one function of the image viewing program. The program may be contained in any computer readable medium including a volatile memory in a computer, a nonvolatile memory for a computer such as a floppy diskette or CD-ROM, as well as the propagated signals such as the stream of bits that represent Interne transmissions of packets or the carrier waves that are transmitted to satellites.

The image viewing program is installed onto the HDD 16 of the PC 10, and is loaded from the HDD 16 into the RAM 14 to be subject to execution control by the CPU 12. The program may also be executed after a program stored on a CD-ROM or the like is read by the CD-ROM drive 18 or the like, or may be executed after being downloaded through a network.

Figure 2:
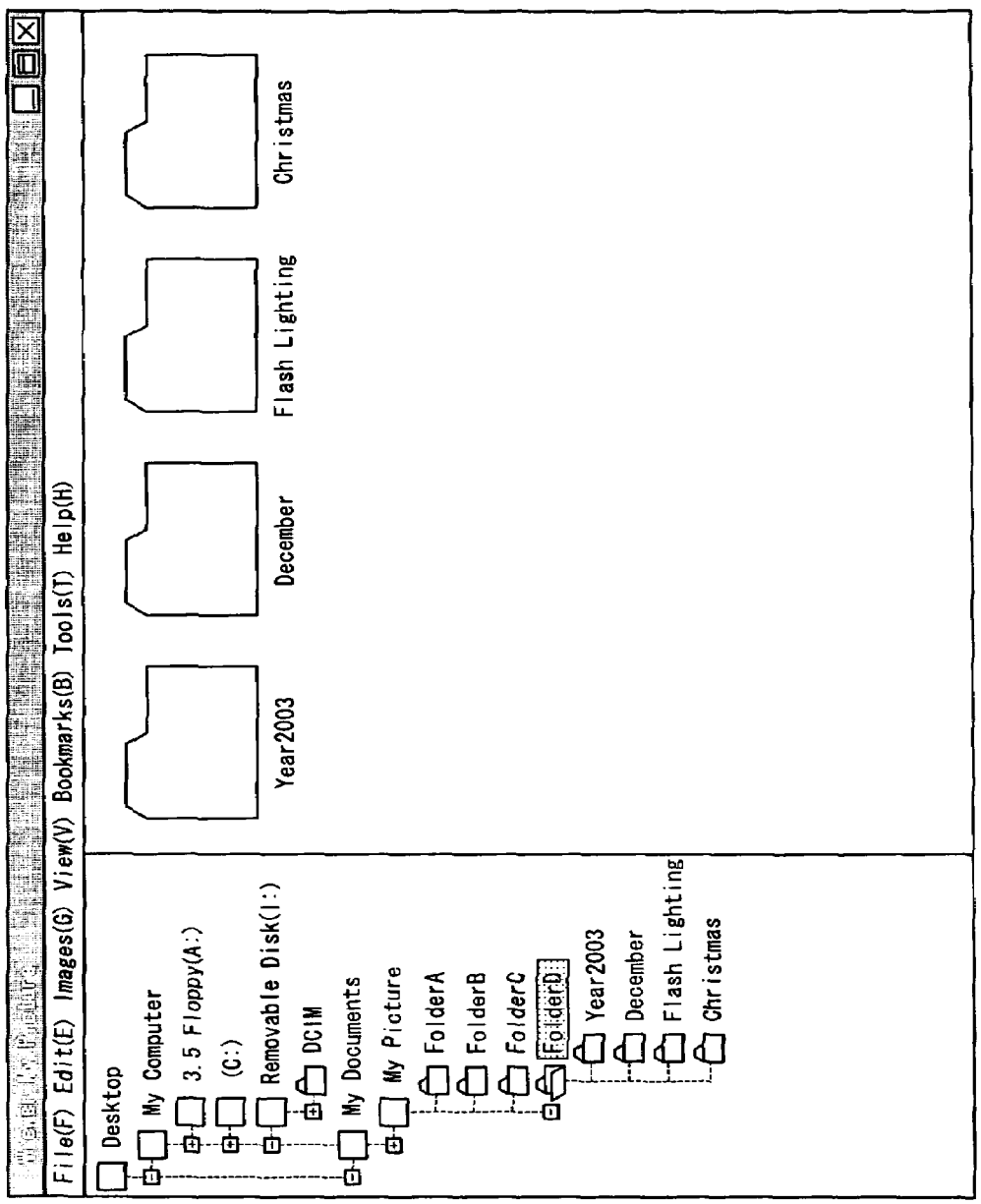
FIG. 2 is a view showing the main window display of an image viewing program.

When the image viewing program is initiated, as shown in FIG. 2, the main window of the image viewing program is displayed on the display apparatus 20.

The main window is composed of a folder tree display area, which is displayed on the left-hand side of the screen, and a thumbnail display area, which displayed on the right-hand side of the screen.

The folders in the personal computer 10 are displayed hierarchically in the folder tree display area. When a folder displayed in the folder tree display area is selected, as shown in FIG. 3, the image files stored in the selected folder are displayed in thumbnail form in the thumbnail display area.

When there are no image files in the selected folder, nothing is displayed in the thumbnail display area, and when there is another folder in the selected folder, the folder icon thereof is displayed. FIG. 2 shows an example of the display when folders (in this case "2003", "December", "Flash Lighting" and "Christmas") are stored in the selected folder (in this case "Folder D").

Figure 3:
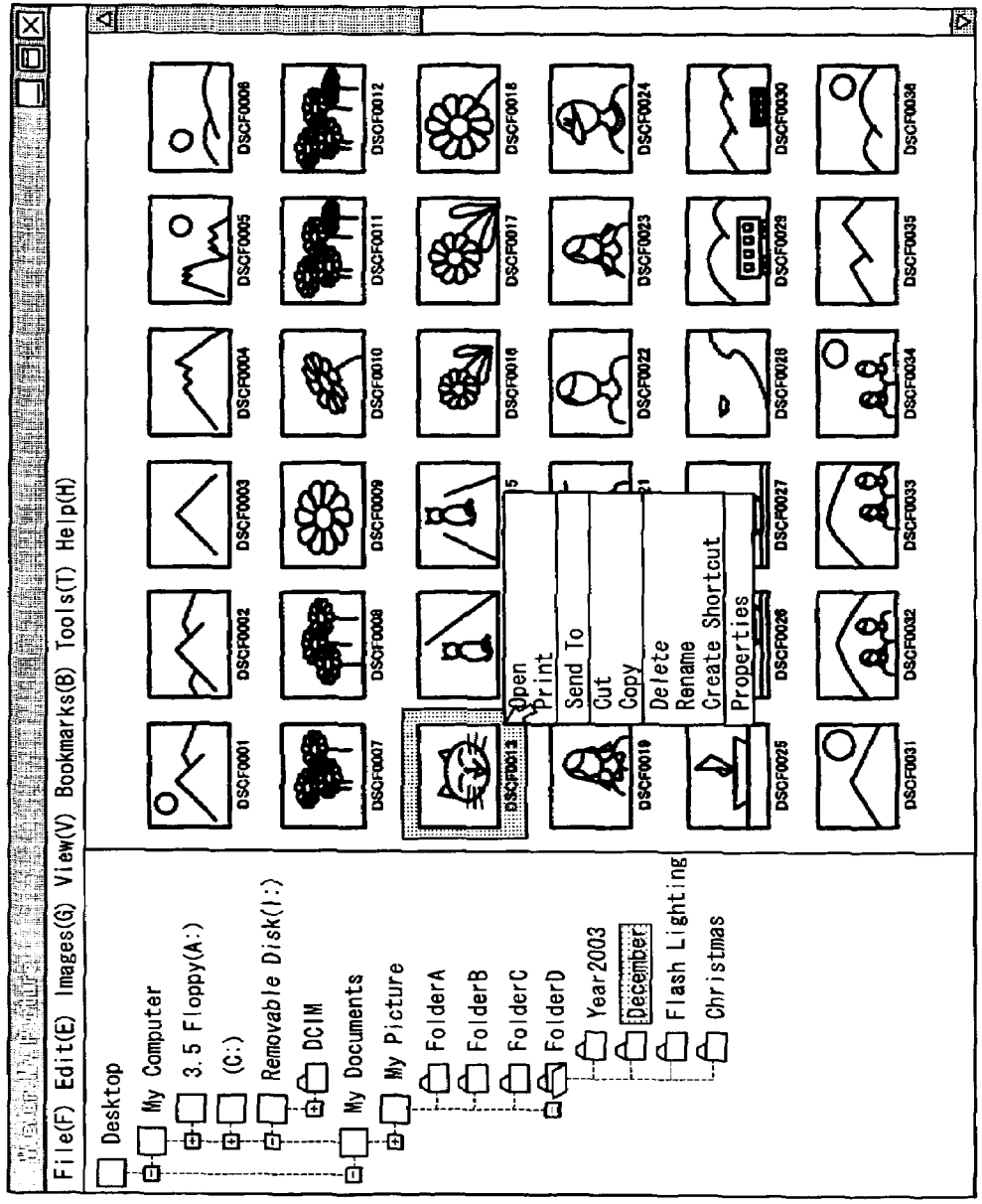
FIG. 3 is a view showing a display example of a window display when conducting file operations.

When an image file is selected (by double clicking thereon) from among the image files displayed in thumbnail form in the thumbnail display area as shown in FIG. 3, an enlarged view of the selected image file is displayed in a separate window.

Further, when a slideshow function is executed, the image files stored in the selected folder are sequentially displayed while being advanced frame by frame at fixed time intervals to carry out a slide show.

In this image viewing program, file operations can be conducted to perform processing such as cutting, copying, deleting, renaming, and short cut creation for files displayed in the thumbnail display area. For example, as shown in FIG. 3, when the mouse pointer is moved onto a file displayed in the thumbnail display area and the right button on the mouse is clicked, the pull-down menu for file operations is displayed, and when the mouse pointer is moved onto a desired processing item in the pull-down menu and the left button on the mouse is clicked, the selected processing is executed. Further, when a file displayed in the thumbnail display area is dragged and dropped (operation in which the mouse pointer is pointed at a target object and the mouse is then moved while keeping the left button on the mouse pressed down, and the left button on the mouse is then released at the target position) onto a folder displayed in the thumbnail display area or the folder tree display area, the file is moved to the folder onto which the file has been dragged and dropped.

The same operations can also be conducted for folders, and processing such as cutting, copying, deleting, renaming and short cut creation can be conducted for folders displayed in the thumbnail display area or folder tree display area.

However, the following processing is conducted with respect to a drag and drop operation for a folder. That is, when a folder (hereinafter referred to as the former folder) displayed in the thumbnail display area or folder tree display area is dragged and dropped onto another folder (hereinafter referred to as the latter folder) displayed in the thumbnail display area or folder tree display area, a new folder is created at the same level as the latter folder onto which the former folder has been dragged and dropped, and shortcut files to files stored in both of the former and latter folders are stored in the newly created folder.

Figure 4:
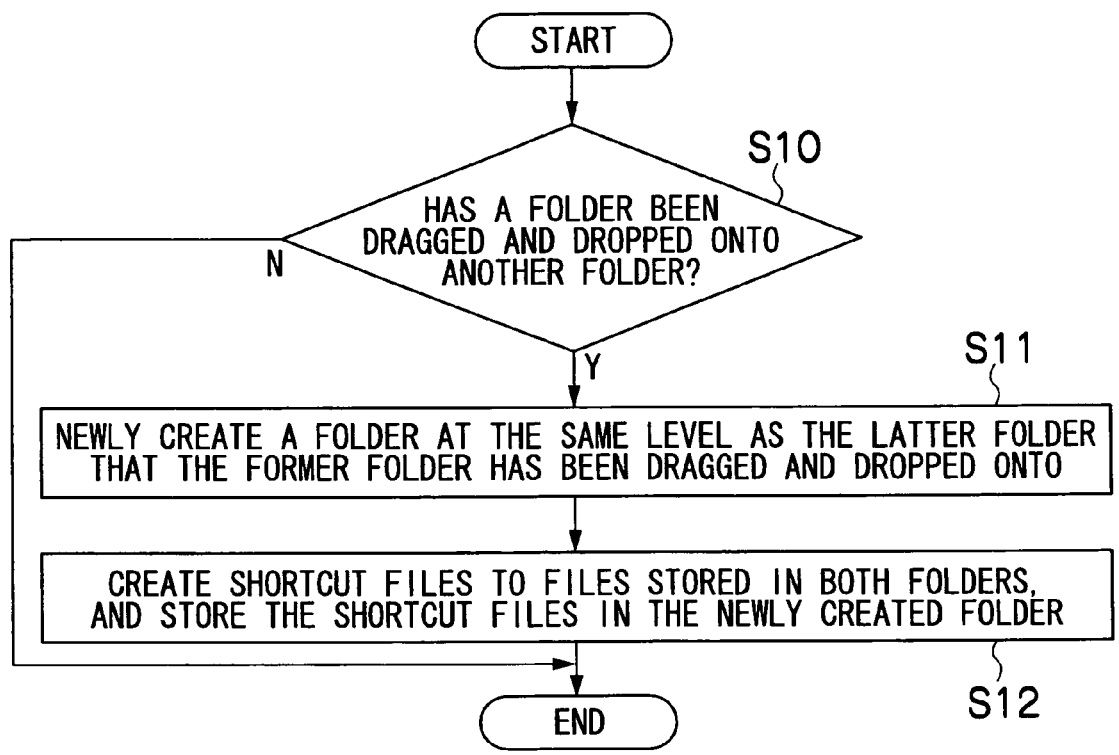
FIG. 4 is a flowchart showing processing procedures when conducting a drag and drop operation for a folder.

FIG. 4 is a flowchart showing processing procedures when a folder is dragged and dropped onto another folder.

As shown in FIG. 4, judgment is made as to whether or not a folder has been dragged and dropped onto another folder based on operation information of the mouse (step S10). When it is judged as a result that a folder (the former folder) has been dragged and dropped onto another folder (the latter folder), a folder (the new folder) is newly created at the same level as the latter folder onto which the former folder has been dragged and dropped (step S11). Then, shortcut files to files stored in both of the former and latter folders are created, and the created shortcut files are stored in the newly created folder (step S112).

Figure 5:
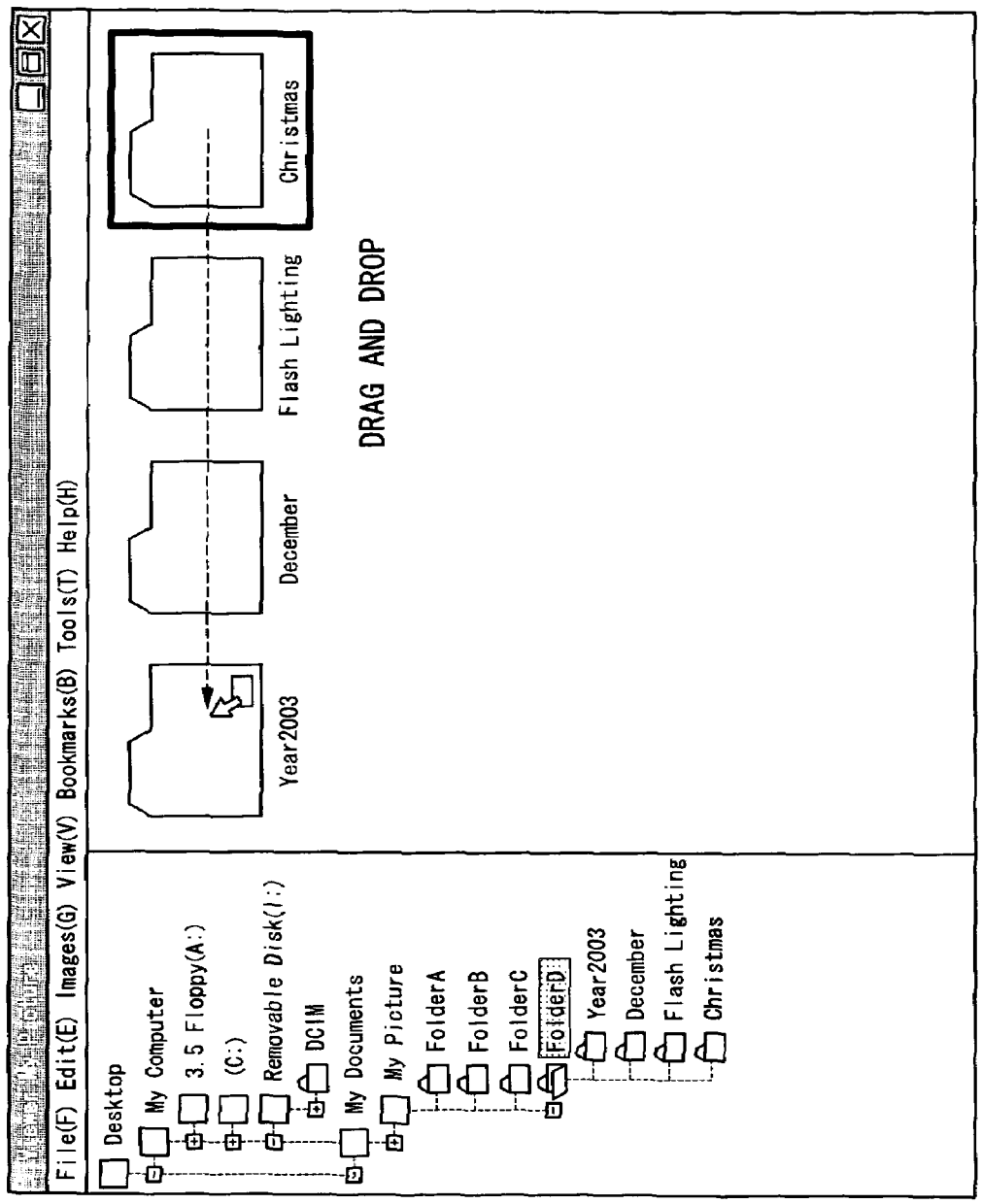
FIG. 5 is an explanatory drawing that illustrates a drag and drop operation for a folder.
Figure 6:
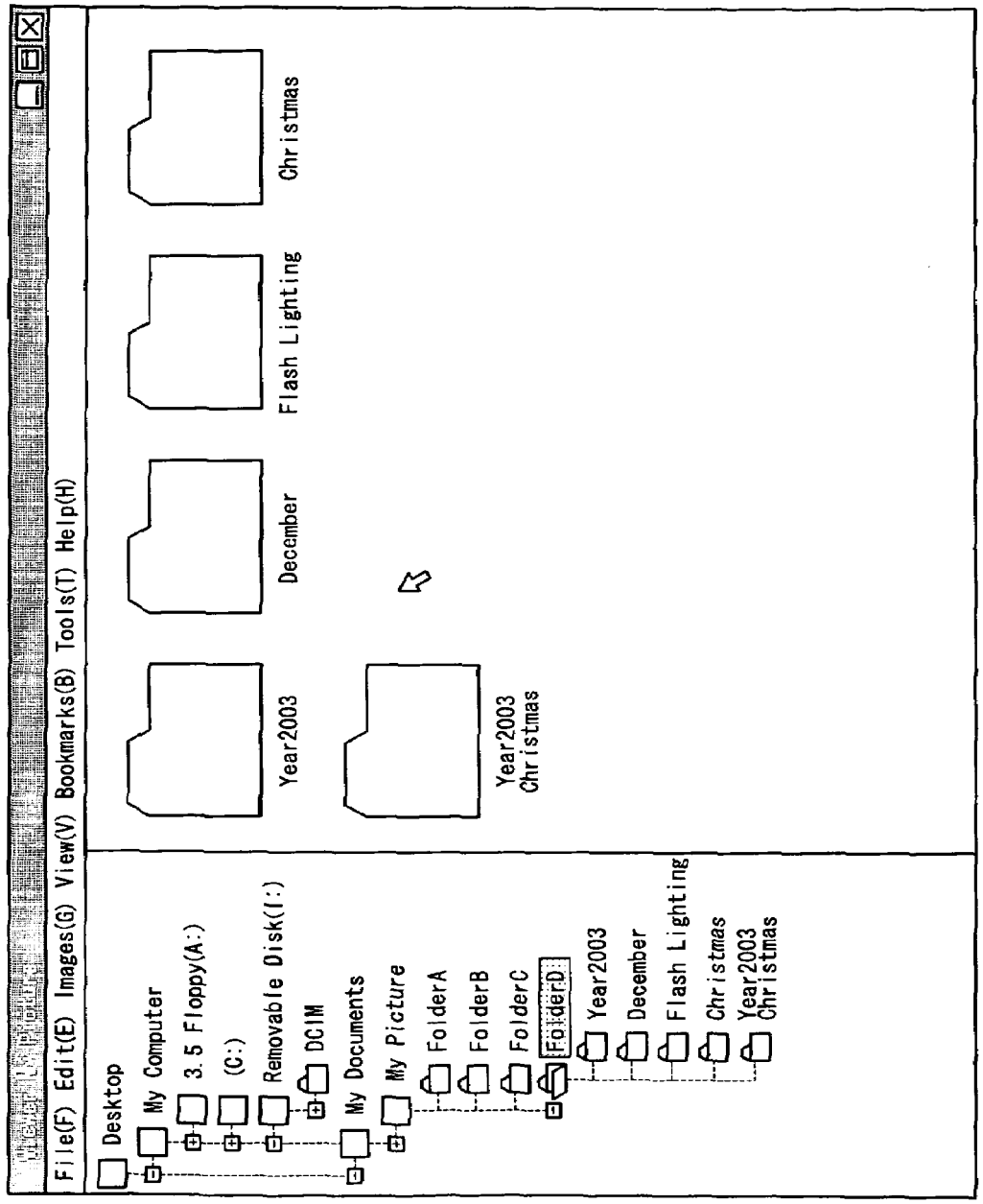
FIG. 6 is a view showing a display example of a window display after dragging and dropping a folder.

For example, as shown in FIG. 5, when a folder named "Christmas" that is stored in a folder named "Folder D" is dragged and dropped onto a folder named "2003" that is also stored in the folder "Folder D", as shown in FIG. 6, a folder is newly created at the same level as the folder "2003."

In this case, the newly created folder is given a name made by combining the folder names of the former and latter folders ("folder name of the latter folder onto which the former folder has been dragged and dropped"+"folder name of the former folder that has been dragged and dropped"). For example, in the above example, since the folder named "Christmas" has been dragged and dropped onto the folder named "2003," as shown in FIG. 6, a new folder name "2003 Christmas" is allocated to the newly created folder.

Figure 7:
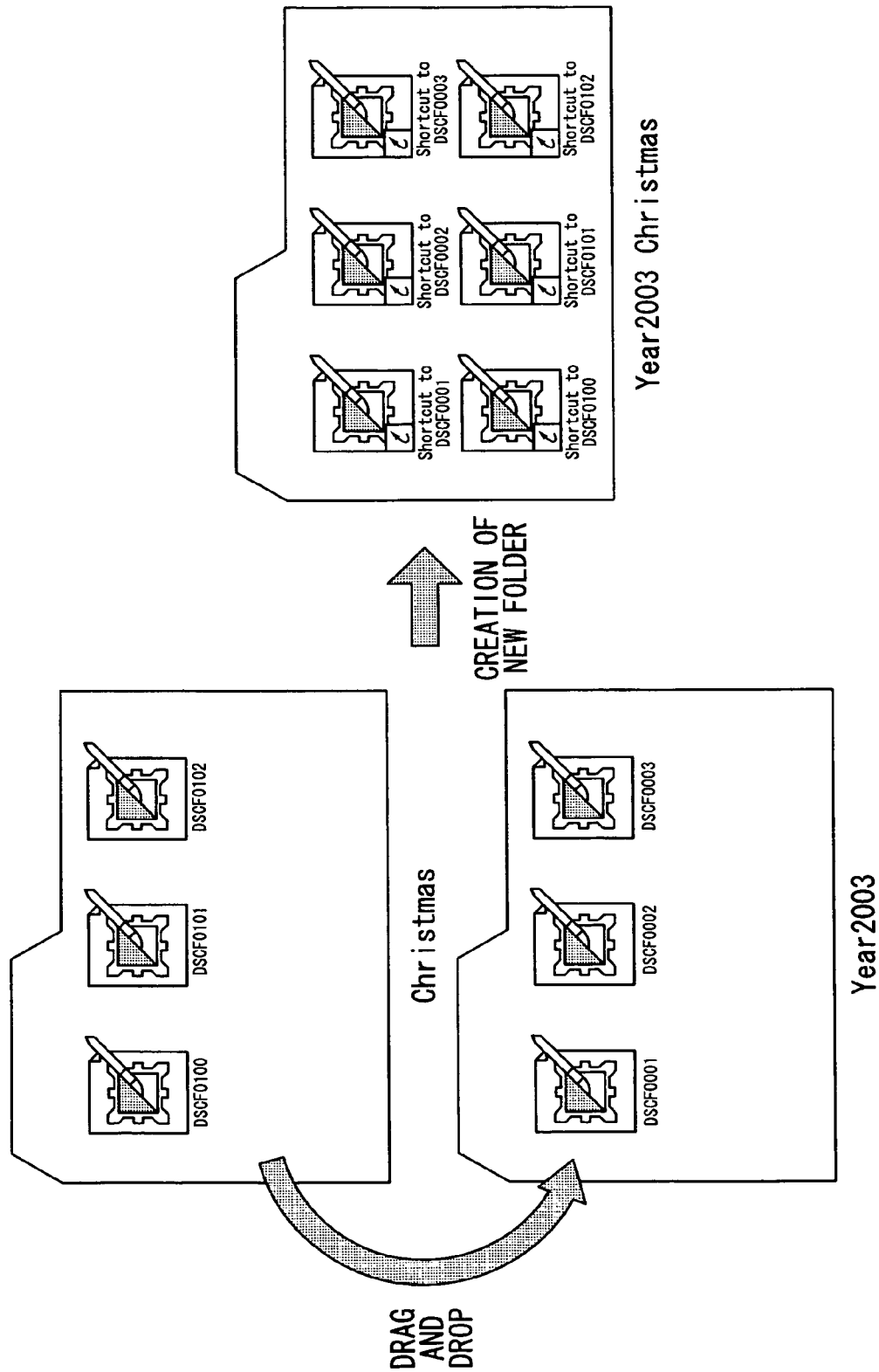
FIG. 7 is a conceptual diagram of file processing caused by dragging and dropping a folder.

Then, shortcut files to files stored in both of the folders are stored in the thus newly created folder ("2003 Christmas"). For example, as shown in FIG. 7, in a case where three image files named "DSCF0001", "DSCF0002" and "DSCF0003" are stored in the folder named "2003" and three image files named "DSCF0100", "DSCF101" and "DSCF0102" are stored in the folder named "Christmas", shortcut files to the three image files named "DSCF0001", "DSCF0002" and "DSCF0003" that are stored in the folder "2003" and shortcut files to the three image files named "DSCF0100", "DSCF0101" and "DSCF0102" that are stored in the folder "Christmas" are stored in the newly created folder "2003 Christmas."

Thus, in the image viewing program of the present embodiment, when a folder displayed in the thumbnail display area or folder tree display area is dragged and dropped onto another folder displayed in the thumbnail display area or folder tree display area, a new folder is created at the same level as the latter folder onto which the former folder has been dragged and dropped, and shortcut files to files stored in both the former and latter folders are stored in the newly created folder. Thereby, classification of image files can be carried out in accordance with the preferences of the user, and management of image files is simplified.

Further, since the folder name that is allocated to the newly created folder combines the folder names of both the folder onto which the folder has been dragged and dropped and the folder that has been dragged and dropped, the history of folder operations can be readily known, facilitating management of the image files. More specifically, the user can infer from a folder name which folder was dragged and dropped onto which other folder, enabling the user to easily grasp the folder arrangement.

Shortcut files are stored in the newly created folder in the present embodiment; however, other processing may be adopted whereby files stored in both of the folders are copied to the newly created folder.

Further, other processing may be adopted whereby the user can select between an operation to copy files and an operation to store shortcut files. Thus, usability is improved.

In this connection, by storing shortcut files as in the above-described embodiment, the operation can be conducted by employing only a small file volume, thereby enabling effective utilization of the hard disk drive.

While an example has been described in the above embodiment for a case in which one folder is dragged and dropped onto a different folder, it is also possible to select a plurality of folders and drag and drop the plurality of folders onto a different folder. In this case, shortcut files are created for the files stored in the plurality of folders, and the shortcut files are stored in the newly created folder. A folder name that combines the folder names of the plurality of folders is allocated to the newly created folder.

For example, as shown in FIG. 8, when the folder named "2003" and the folder named "Christmas" are selected and then dragged and dropped onto a folder named "Flash Lighting", a folder named "Flash Lighting 2003 Christmas" is newly created, and shortcut files to all files stored in both the folders are stored in the new folder.

It is also possible to drag and drop a folder that has already been created by a dragging and dropping operation. In this case, copies of shortcut files are stored in the newly created folder.

Figure 9:
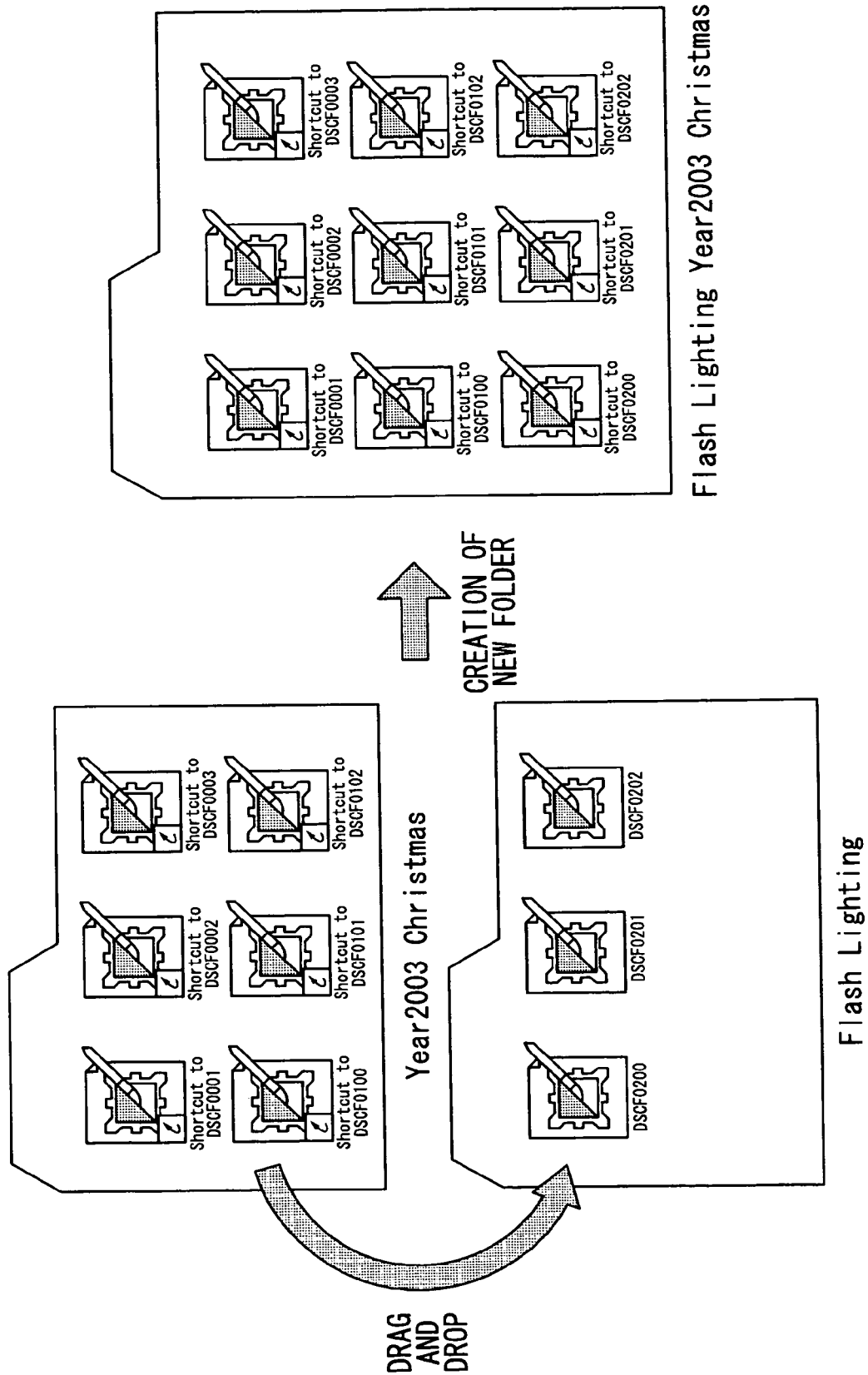
FIG. 9 is a conceptual diagram of file processing caused by dragging and dropping a folder.

For example, as shown in FIG. 9, when a folder named "2003 Christmas" that was created by dragging and dropping a folder named "Christmas" onto a folder named "2003" is dragged and dropped onto a folder named "Flash Lighting", a folder named "Flash Lighting 2003 Christmas" is newly created. Then, copies of the shortcut files that are stored in the folder "2003 Christmas" are stored in the newly created folder and, further, shortcut files to files stored in the folder "Flash Lighting" are also stored in the newly created folder.

According to this embodiment, when one folder is dragged and dropped onto another folder, a new folder is created at the same level as the latter folder onto which the former folder has been dragged and dropped and shortcut files to all the files stored in both of the former and latter folders are stored in the newly created folder; however, other processing may be adopted whereby shortcut files to only files that are commonly stored in both of the former and latter folders are stored in the newly created folder.

Figure 10:
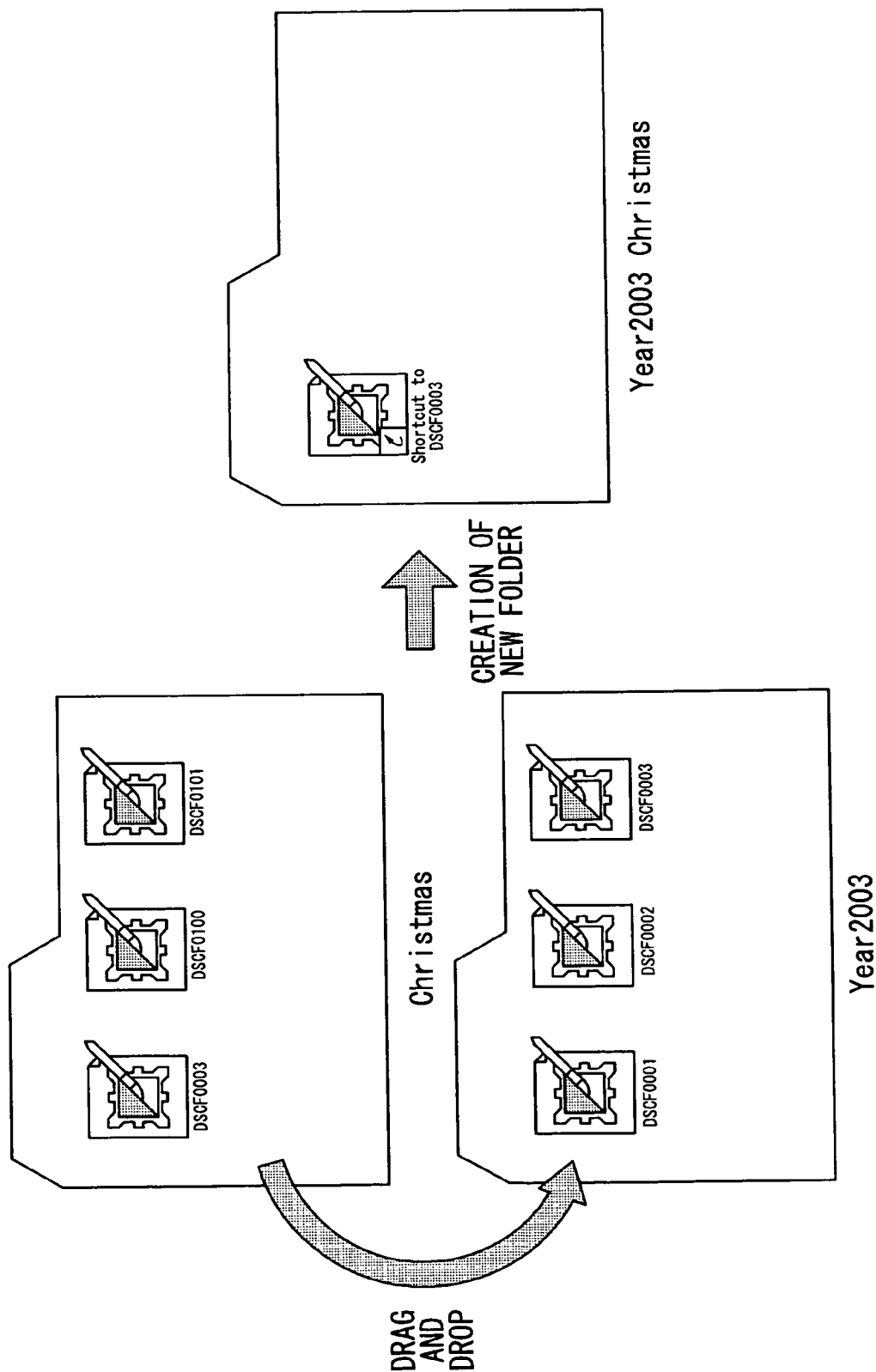
FIG. 10 is a conceptual diagram of file processing caused by dragging and dropping a folder.

More specifically, for example as shown in FIG. 10, in a case where three image files named "DSCF0001", "DSCF0002" and "DSCF0003" are stored in a folder named "2003" and three image files named "DSCF0003", "DSCF0100" and "DSCF0101" are stored in a folder named "Christmas", when the folder "Christmas" is dragged and dropped onto the folder "2003", a new folder named "2003 Christmas" is created at the same level as the folder "2003" onto which the folder "Christmas" has been dragged and dropped, and a shortcut file to only the file (in this case, the image file named "DSCF0003") that is commonly stored in both of the folders is created in the newly created folder.

Figure 11:
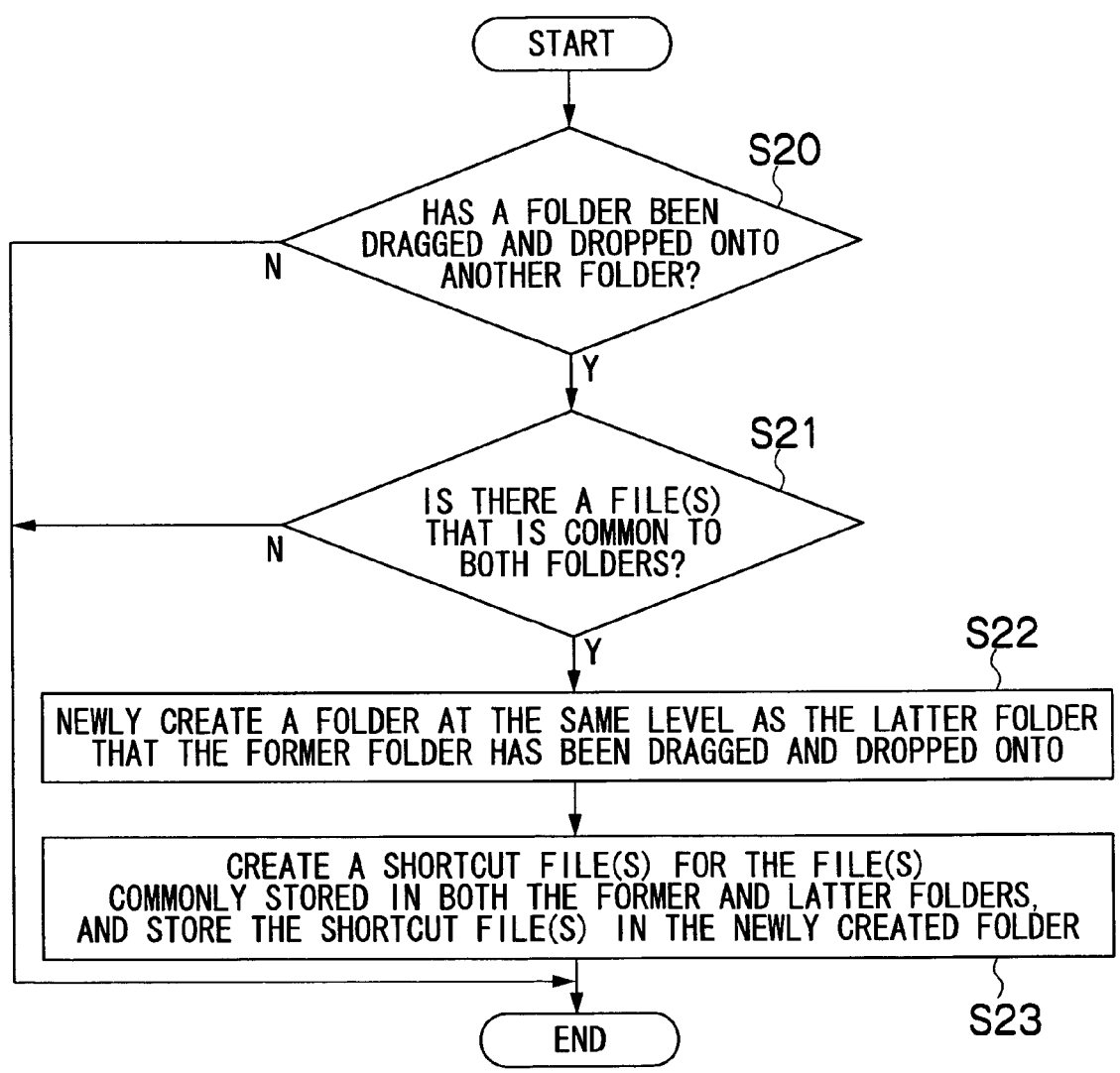
FIG. 11 is a flowchart showing processing procedures when conducting a drag and drop operation for a folder.

FIG. 11 is a flowchart showing processing procedures when shortcut files to only files that are commonly stored in two folders are stored in a new folder.

First, the CPU 12 judges whether or not a folder has been dragged and dropped onto another folder based on operation information of the mouse (step S20). When it is judged as a result that a folder has been dragged and dropped onto another folder, the CPU 12 determines whether or not at least one image file is commonly stored in both of the former and latter folders (step S21). When it is determined as a result that an image file is commonly stored in both of the former and latter folders, a folder is newly created at the same level as the latter folder onto which the former folder has been dragged and dropped (step S22). Then, a shortcut file is created for the file that is commonly stored in both of the former and latter folders, and the created shortcut file is stored in the newly created folder (step S23).

Thus, processing may be adopted whereby shortcut files to image files commonly stored in both of the folders involved in the drag and drop operation are stored in the newly created folder. When files are processed in this manner, management of image files can be simplified similarly to the embodiment previously described.

Shortcut files to image files commonly stored in both of the folders involved in the drag and drop operation are stored in the newly created folder in the above-described embodiment; however, other processing may be adopted whereby copies of image files commonly stored in both of the folders involved in the drag and drop operation are stored in the newly created folder.

When dragging and dropping, it is preferable that the user can select between processing which stores in the newly created folder the shortcut files to only the image files that are commonly stored in both of the folders, as in the present embodiment, and processing which stores in the newly created folder the shortcut files to all the image files stored in both of the folders, as in the foregoing embodiment. This processing selection can be conducted, for example, in the following manner.

Figure 12:
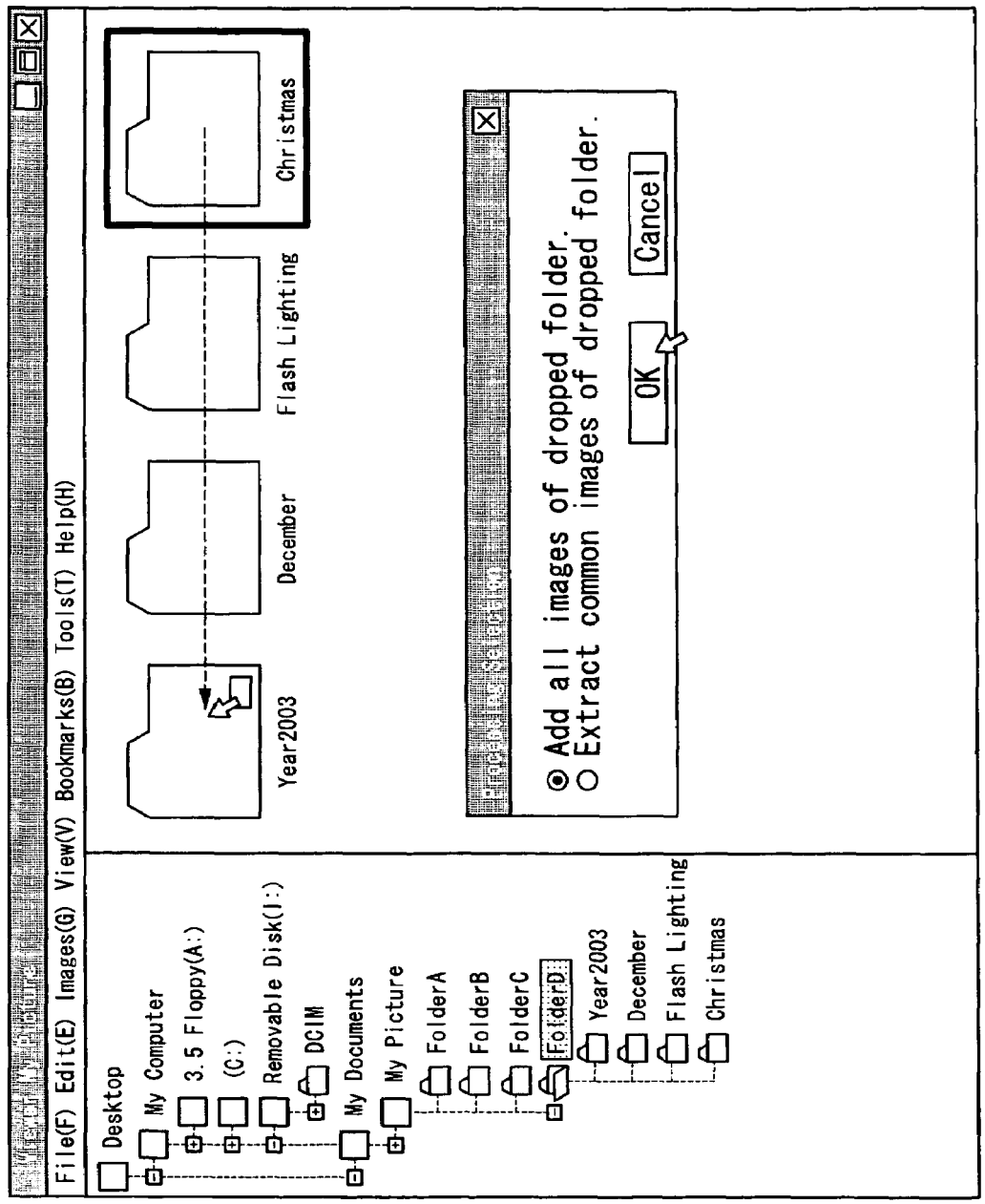
FIG. 12 is a view showing a display example of a window display when dragging and dropping a folder.

That is, as shown in FIG. 12, when a folder is dragged and dropped onto another folder, a dialog box for selecting processing is displayed as a pop-up box, and the processing to be conducted is selected from the dialog box. Selection can be made by checking the check box of the processing to be executed (pointing the mouse pointer at the check box of the processing to be executed and then clicking), and when the mouse pointer is pointed at the "OK" button and the mouse is clicked, the selected processing is executed.

Figure 13:
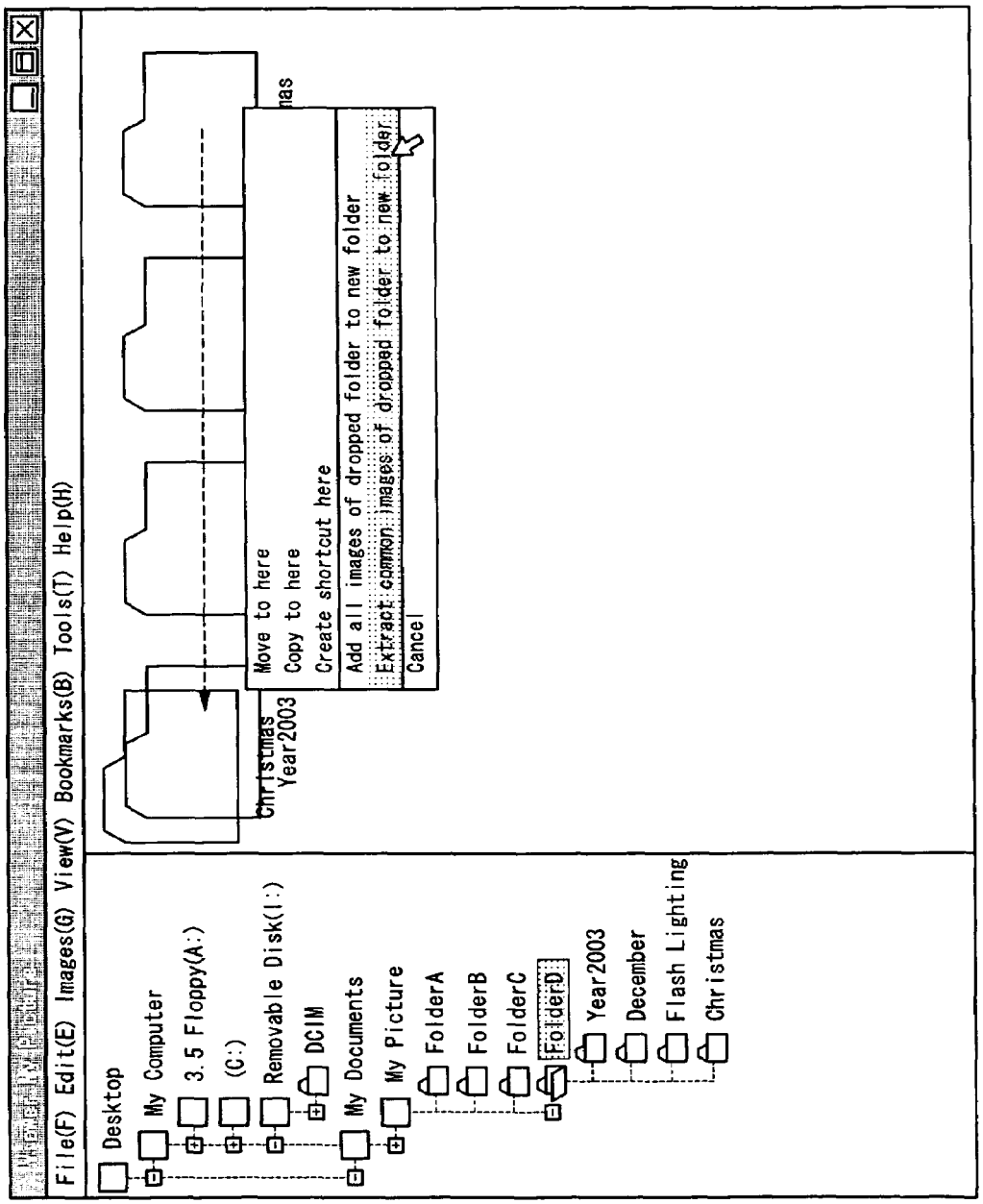
FIG. 13 is a view showing a display example of a window display when dragging and dropping a folder.

Further, for example, as shown in FIG. 13, when a folder is dragged and dropped onto another folder while keeping the right button on the mouse pressed down, a pull-down menu for selecting processing is displayed and the processing to be executed is selected from the items displayed in the pull-down menu. Selection is made by aligning the mouse pointer with the processing item to be executed, and when the mouse is clicked the selected processing is executed.

By enabling selection of the processing to be executed in this manner, usability is improved and management of image files is simplified further.

When dragging and dropping, other processing may be adopted whereby the user can select between processing that stores in a newly created folder copies of only image files that are commonly stored in both folders, and processing that stores in a newly created folder copies of all image files stored in both folders.

In the above-described embodiments, shortcut files are stored in a folder newly created by dragging and dropping, and when these shortcut files are deleted, all the files that are linked to by the shortcut files are also deleted. Thus, it is no longer necessary to process files individually, making the management of files easier.

In this connection, other processing may be adopted whereby the user can select between processing which deletes only the shortcut files and processing which also deletes the files that are linked to by the shortcut files, thus improving usability.

Although examples have been described for the embodiments in which the file management program according to the present invention is incorporated into an image viewing program that handles image files, the file management program of the present invention can also be used when handling files other than image files (such as text files).

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A computer-readable storage medium having a computer program stored therein, the computer program when executed causes a computer to perform a file management program for processing by a computer, the file management program comprising:

a first code segment for, when an icon of a first folder displayed on a display apparatus is dragged and dropped onto another icon of a second folder displayed on the display apparatus, a user interface is generated for selecting between processing which stores in the newly created folder the copies of the files that are commonly stored in both of the folders, and processing which stores in the newly created folder the copies of the files stored in each of the folders;

a second code segment for, when the processing which stores in the newly created folder the copies of the files stored in each of the folders is selected, creating a new folder at the same level as the second folder and copying a file stored in the first folder and a file stored in the second folder into the newly created folder; and a third code segment for, when the processing which stores in the newly created folder the copies of the files that are commonly stored in both of the folders is selected, creating a new folder at the same level as the second folder, and copying in the newly created folder the common files between the files stored in the first folder and files stored in the second folder.

2. The computer-readable storage medium of claim 1, wherein the file management program further comprises a fourth code segment for giving to the newly created folder a folder name made by combining a folder name of the first folder and a folder name of the second folder.

3. The computer-readable storage medium of claim 1, wherein said file stored in the first folder and said file stored in the second folder are image data files.

4. The computer-readable storage medium of claim 1, wherein the first code segment, when the first folder is dragged and dropped onto the second folder, the generated user interface is a dialog box displayed as a pop-up box for selecting processing and the processing to be conducted is selected from the dialog box.

5. The computer-readable storage medium of claim 1, wherein the first code segment, when the first folder is dragged and dropped onto the second folder while keeping the right button on the mouse pressed down, the generated user interface is displayed as a pull-down menu for selecting processing and the processing to be executed is selected from the items displayed in the pull-down menu.

6. A computer-readable storage medium having a computer program stored therein, the computer program when executed causes a computer to perform a file management program for processing by a computer, the file management program comprising:

a first code segment for, when an icon of a first folder displayed on a display apparatus is dragged and dropped onto another icon of a second folder displayed on the display apparatus, a user interface is generated for selecting between processing which stores in the newly created folder the shortcut files to the files that are commonly stored in both of the folders, and processing which stores in the newly created folder the shortcut files to the files stored in each of the folders;

a second code segment for, when the processing which stores in the newly created folder the shortcut files to the files stored in each of the folders is selected, creating a new folder at the same level as the second folder and copying a shortcut file to a file stored in the first folder and a shortcut file to a file stored in the second folder into the newly created folder; and a third code segment for, when the processing which stores in the newly created folder the shortcut files to the files that are commonly stored in both of the folders is selected, creating a new folder at the same level as the second folder, and copying in the newly created folder the shortcut file of the common files between the files stored in the first folder and files stored in the second folder.

7. The computer-readable storage medium of claim 6, wherein the file management program further comprises a fourth code segment for giving to the newly created folder a folder name made by combining a folder name of the first folder and a folder name of the second folder.

8. The computer-readable storage medium of claim 7, wherein the file management program further comprises a fourth code segment for, when the shortcut file is deleted, deleting all files that are linked to by the shortcut file.

9. The computer-readable storage medium of claim 6, wherein the file management program further comprises a fourth code segment for, when the shortcut file is deleted, deleting all files that are linked to by the shortcut file.

10. The computer-readable storage medium of claim 6, wherein said file stored in the first folder and said file stored in the second folder are image data files.

11. The computer-readable storage medium of claim 6, wherein the first code segment, when the first folder is dragged and dropped onto the second folder, the generated user interface is a dialog box displayed as a pop-up box for selecting processing and the processing to be conducted is selected from the dialog box.

12. The computer-readable storage medium of claim 6, wherein the first code segment, when the first folder is dragged and dropped onto the second folder while keeping the right button on the mouse pressed down, the generated user interface is displayed as a pull-down menu for selecting processing and the processing to be executed is selected from the items displayed in the pull-down menu.

* * * * *